Jan. 14, 1936.     R. J. DEARBORN ET AL     2,028,100
TREATMENT OF HYDROCARBON OILS
Filed Oct. 18, 1930     2 Sheets-Sheet 1
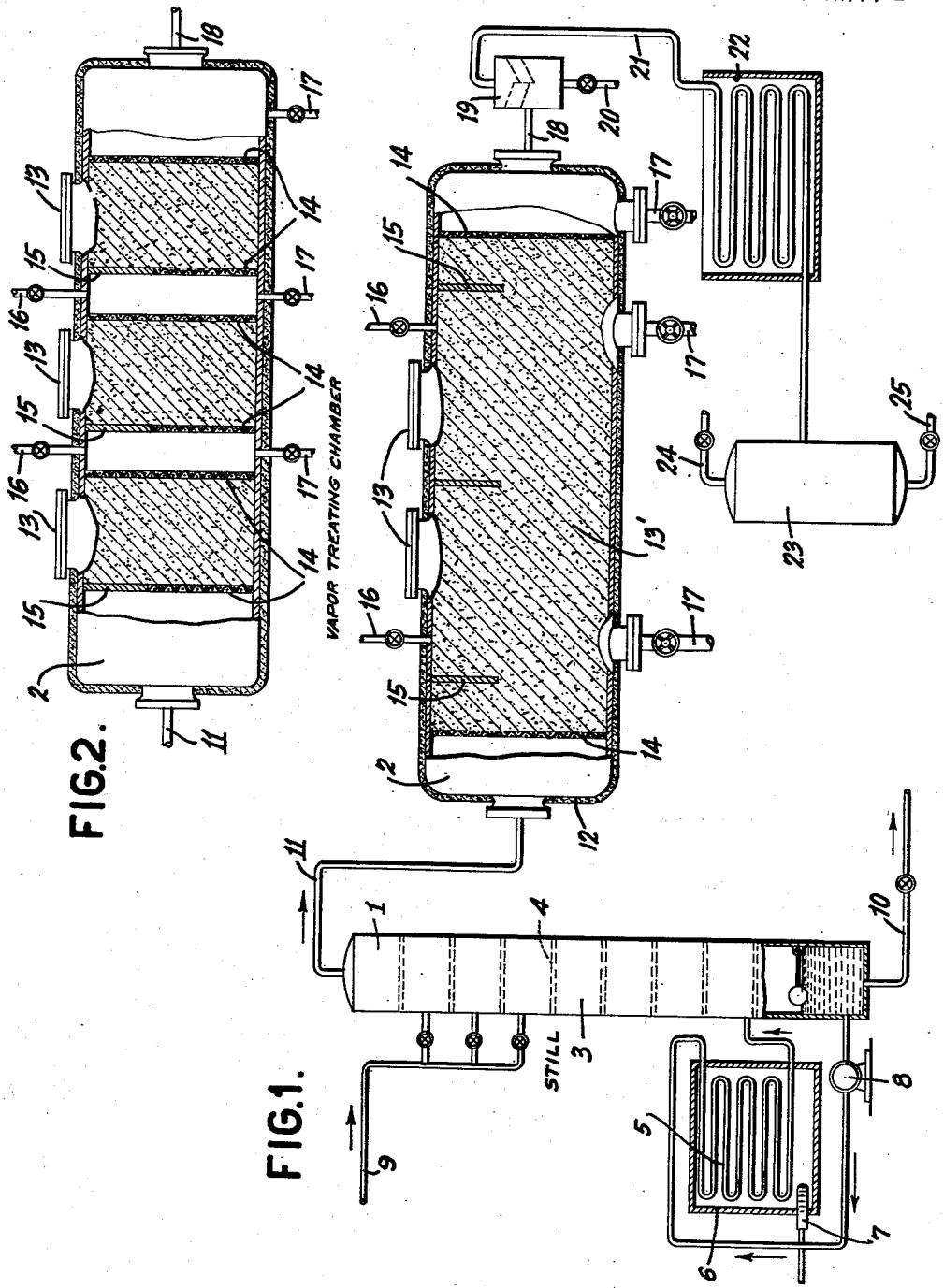
INVENTORS
R. J. Dearborn
William M. Stratford
BY ATTORNEY
R. J. Dearborn Jan. 14, 1936.    R. J. DEARBORN ET AL    2,028,100
TREATMENT OF HYDROCARBON OILS
Filed Oct. 18, 1930    2 Sheets-Sheet 2
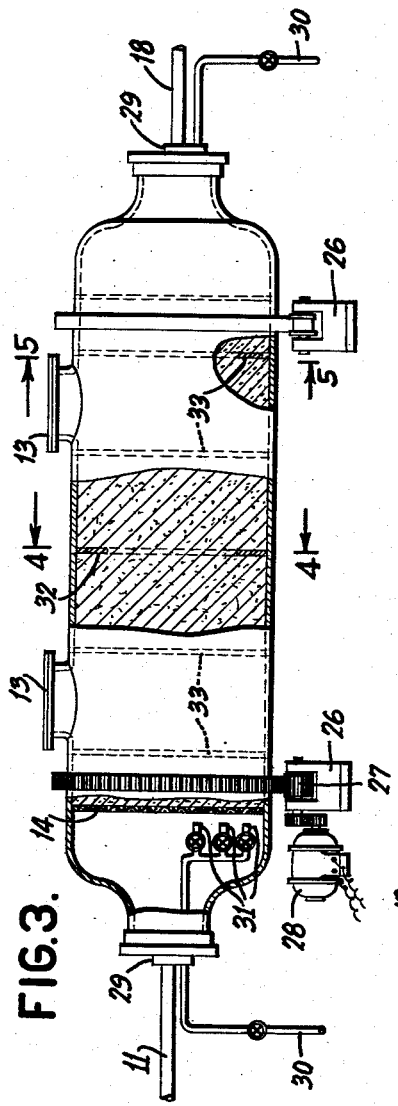
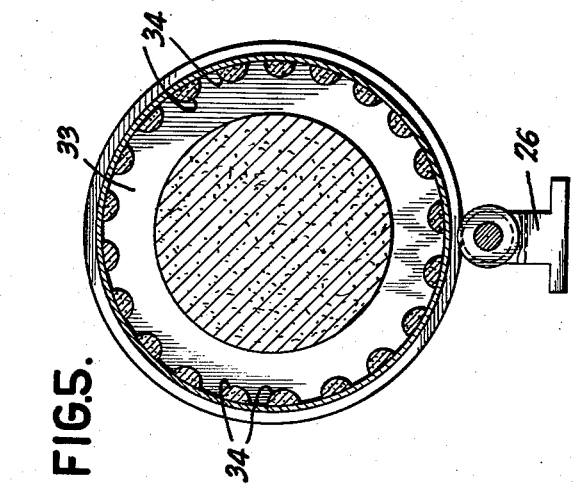
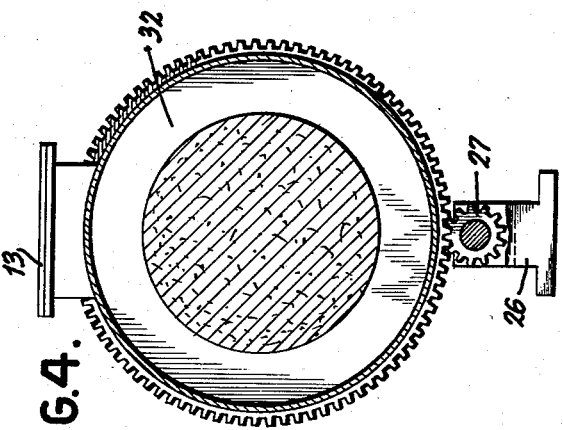
INVENTORS
R. J. Dearborn
William M. Stafford
BY ATTORNEY
R. J. Dearborn Patented Jan. 14, 1936

2,028,100

UNITED STATES PATENT OFFICE 2,028,100

TREATMENT OF HYDROCARBON OILS

Richard J. Dearborn, Summit, N. J., and William M. Stratford, New York, N. Y., assignors to The Texas Company, New York, N. Y., a corporation of Delaware Application October 18, 1930, Serial No. 489,516

8 Claims. (Cl. 196—96)

This invention relates to the treatment of hydrocarbon oils and particularly to the treatment of volatile hydrocarbon oils of the nature of cracked naphthas by vapor filtration through finely divided solids such as fuller's earth or other catalytic absorbent material.

Most synthetic petroleum distillates, especially those obtained from liquid-phase and vapor-phase cracking processes, contain substantial amounts of unsaturated hydrocarbons some of which render the raw product unsuitable for market. The undesirable compounds may consist of colored bodies that give the distillate a dark color. Or the compounds may comprise constituents extremely unstable in character that gradually darken in color or deposit a viscous, gummy substance when the oil is stored. As a result the raw distillates are usually treated in some manner to remove the undesirable compounds or convert them into a less objectionable form. One of the common methods of treatment is to filter the vapors through a catalytic absorbent material, such as fuller's earth, to polymerize a portion of the unsaturated compounds and separate them in the form of high boiling point polymers.

The present invention involves a process whereby the vapors are passed horizontally through an elongated filtering chamber which is packed substantially its entire length with an absorbent catalytic material. By passing the vapors in a horizontal direction, it will be observed that they travel at right angles to the force of gravity and likewise at right angles to the flow of condensates in the filtering material. The vapors, therefore, pass a substantial distance lengthwise, while the polymers and other condensates drain a comparatively short distance vertically of the filter bed. This method allows rapid and unobstructed separation of liquids through a comparatively short distance and permits free passage of the vapors through the entire length of the filtering chamber. The invention also includes provision for rotating, if desired, the filtering chamber. This procedure has the advantage that the filter is kept agitated, uniform and free from packing, so that there is efficient contact with the vapors and efficient use of substantially the entire bed of catalytic material.

The invention contemplates the treatment of any petroleum distillate that contains a substantial amount of undesirable unsaturated hydrocarbons by filtering the vapors horizontally through a bed of absorbent catalytic material. The vapors for the process may be derived from liquid-phase or vapor-phase cracking, from the hydrogenation of oils or from any other conversion operation with or without the use of a catalyst. The vapors treated according to the process of the invention may come directly from the conversion apparatus or they may be fractionated prior to the vapor filtration. Also, the vapors may be derived from a rerun distillation process, in which a cracked naphtha or pressure distillate is redistilled for end point products and the vapors from the redistillation operation passed horizontally through the filtration apparatus with or without a prior fractionating step.

The accompanying drawings show an apparatus suitable for carrying out process of the invention in which the same reference characters throughout the different figures represent the same respective parts.

Fig. 1 is an elevation partly in section, illustrating a complete hydrocarbon oil treating apparatus.

Fig. 2 shows a modification in which the bed of filtering material within the vapor treating chamber is divided into a plurality of sections.

Fig. 3 illustrates a modified form of vapor treating chamber adapted to be rotated.

Fig. 4 is a section taken through the line 4—4 of Fig. 3 in the direction of the arrows, showing the structure of the center baffle of the vapor treating chamber.

Fig. 5 is a section through the line 5—5 of Fig. 3 in the direction of the arrows, showing the structure of the end baffles.

Referring to Fig. 1, the apparatus comprises a still 1, and a vapor treating chamber 2. The still 1 comprises a tower 3, equipped with trays 4 and a heating coil 5, connected to the tower and located within a furnace 6. A burner 7 supplies heat to the furnace for heating the coil therein. A pump 8 circulates oil from the bottom of the tower through the heating coil and back to the tower preferably at a point immediately above the bottom tray. A supply line 9 in communication with a suitable source of supply (not shown) supplies a cracked naphtha or other charging stock to the tower immediately above one or more of the upper trays. The pipe 10 conducts the unvaporized residue from the bottom of tower while the vapor line 11 carries the vapors from the top of the tower to the treating chamber 2.

The vapor treating chamber consists of an elongated horizontal drum about 10 ft. in diameter and 40 ft. long and may be covered with suitable insulating material 12. Manholes 13 are provided for introducing the solid filtering material 13' to the interior of the chamber to fill the space compactly between the screens 14. Baffles 15 depending from the roof extend downwardly a suitable distance into the filtering material to divert the path of the vapors as they pass through the chamber. Vapor outlets 16 are positioned between the baffles to release gas which may accumulate in pockets between the baffles. Liquid draw-off lines 17 in the bottom of the chamber are adapted to draw off polymers and condensates which may accumulate in the treating chamber during the treating operation. The line 18 conducts the vapors from the vapor treating chamber to a mist separator 19 wherein liquid particles carried in the gas may be separated and drawn off through the line 20. Vapors from the separator 19 pass through line 21 to the condenser 22. Condensates from the condenser collect in receiver 23 which is equipped with usual gas release pipe 24 and liquid drawoff line 25.

Fig. 2 illustrates a slightly modified form of the vapor treating chamber 2. In this embodiment the bed of filtering material is divided into a plurality of longitudinally spaced beds with vapor spaces between the various sections. For convenience three separate filter beds are shown in the drawings, but any desired number may be employed. The gas release pipes 16 and drain pipe 17 communicating with the vapor spaces are merely illustrative and these pipes may be located at the filter bed sections if desired. The baffles 15 in this modification are preferably located at the face of filter beds. However, baffles within the filter bed as shown in Fig. 1 might well be used. If the baffles are at the face of the filter sections as shown, then screens 14 at the face of the sections are attached to the bottom of the baffles and extend therefrom to the bottom of the chamber.

In Fig. 3 is shown a modification wherein the vapor treating chamber is adapted to be rotated on the roller supports 26. A drive pinion 27 connected to motor 28 or other suitable power mechanism gives a rotating movement to the chamber. The vapor inlet 11 and outlet 18 at the ends of the chamber are located in suitable stuffing boxes 29 to provide vapor-tight connections with the rotating chamber. In this modification the condensate, instead of being drawn off at the bottom as shown in Fig. 1, is drawn off at the ends through pipes 30. These pipes terminate in branches 31 so that the liquid accumulating in the chamber can be maintained at various levels. Provision is made in the rotating type of filtering chamber for controlling the flow of vapors and the condensates by a particular construction of the baffles as shown in Figs. 4 and 5. The center baffle 32 consists of an annular ring, fitting tightly to the internal surface of the chamber. This construction of the center baffle insures complete contact of the vapors with the filtering material and avoids passage of the vapors in a channel along the roof of the chamber. The condensate collecting on either side of annular baffle 32 may flow to the opposite ends of the chamber, by seepage through the perforations 34 in the end baffles 33, to be drawn off through pipes 30.

In practicing the invention with the apparatus illustrated in the drawings, a cracked naphtha with a boiling range of about 100° F. to 500° F. is introduced into the tower 3 through the supply line 9 to act as a reflux and to be partially vaporized by the hot vapors inside the tower 1.

The unvaporized oil runs down over the trays 4 and collects in the bottom of the tower where it is circulated through the heating coil 5 to add sufficient heat to insure complete vaporization of the gasoline fractions. A heavy liquid in the nature of gas oil is drawn from the bottom of the tower and may be used as fuel or a cracking stock. The vapors, escaping at the top of the tower through vapor line 11 are usually end point or slightly above end point gasoline.

As the vapors percolate through the filtering material the undesirable unsaturates are polymerized and condensed along with other high boiling constituents of the vapors. The path of the vapors is diverted toward the center of the treating chamber by the baffles in order to avoid channeling along the roof in case the clay packs leaving an open space or in case the clay at the top is more porous because of less concentration of liquids. It will be observed that the condensates have a relatively short distance to settle through the clay to reach the drain lines 17. This arrangement is a distinct advantage, in that the liquids quickly separate by gravity at right angles to the flow of vapors and a free passage of vapors is insured. The quantity of liquids condensing from the vapors may be reduced by suitable insulation of the chamber as is common in the art. In case the condensation is excessive, it may be desirable to heat the chamber in any suitable manner. Gas pockets frequently collect between the baffles and are released at intervals through pipes 16.

In case a plurality of longitudinally spaced filter beds are used as shown in Fig. 2, the vapors pass successively through a series of treating zones. The vapors from each preceding zone pass through a vapor space before entering the next succeeding zone. In this way the vapors become thoroughly mixed between treating sections should any separation occur during the filtration. Also, in case there is poor treatment in one filtering section because of channeling or other causes, the vapors will not pass entirely through the filtering material untreated as might happen in a single filter, but instead treatment will be assured in one or more of the sections. Moreover, it may be desirable to use different filtering materials in the various sections, as for instance, a partially spent or otherwise inefficient clay for the initial treatment and then a new or similar efficient material for the final treatment. Furthermore, the invention contemplates other variations in the filter beds such as size or shape of the respective sections, the material of each section of a different mesh or composition, etc.

The treated vapors from the chamber 2 often contain substantial amounts of liquids suspended therein. This is especially true if considerable condensation occurs during the filtration or the rate of flow of the vapors is quite rapid. The suspended material, consisting chiefly of dark colored polymers and high boiling compounds would be injurious to the final product if not removed. Therefore, the mist containing the suspended liquids is passed through a separator 19, which may be any usual type of mist separator. In this separator the suspended liquids are precipitated and collected in the bottom thereof to be drained through line 20. These liquids may be joined with the liquids drained by pipes 17 from the chamber 2, and the mixture passed to the tower 3 or disposed of otherwise. The clean vapors from separator 19 are condensed and collected in the receiver 23. The product is end point gasoline, preferably about 400° F. final boiling point, of good color and stable in quality.

In using the rotary type of filtering chamber, as shown in Fig. 3, the vapors travel through the clay bed in much the same manner as previously described. Intimate contact with the filtering material is effected by the annular baffle 32 and also by the rotary movement of the chamber. The rotation agitates the filtering material and produces uniform filtration by constantly changing the relative position of the solid particles making up the filtering material. The condensates collect in bodies on either side of the annular baffle 32 where a constant level is maintained at the respective ends of the chamber by seepage of the liquid through the perforations 33 (Fig. 5). The quantity of liquid collecting in the chamber may be controlled by drawing off the liquid through selected branches 31 of the pipe 30.

Various modifications will be apparent to those skilled in the art and, therefore, the invention is not to be limited by the details in structure of the apparatus or in the particular manner described for carrying out the process. It is to be understood that other modifications may be made without departing from the spirit of the invention and only such limitations are to be imposed as indicated in the appended claims.

We claim:

1. The method of treating hydrocarbon oils to purify and stabilize the same which comprises passing a stream of cracked hydrocarbon vapors containing unstable unsaturated compounds through an elongated horizontal bed of absorbent catalytic material capable of polymerizing the unstable compounds, rotating said bed to provide uniform contact of the vapors with the catalytic material, and continuously separating polymers and condensates formed in said catalytic material.

2. In an apparatus for treating hydrocarbon oils, the combination of a still, an elongated horizontal chamber packed substantially the entire length with an absorbent catalytic material, a plurality of longitudinally spaced annular baffle members in said chamber, means for rotating said chamber, means for conducting vapors from the still to the chamber and means for removing from the chamber vapors which have passed through said catalytic material.

3. The method of refining hydrocarbon vapors containing unstable unsaturated compounds which comprises passing the vapors horizontally through a series of bodies of solid absorptive catalyst, thereby polymerizing a substantial amount of said unstable compounds, collecting the vapors issuing from a preceding body of catalysts in a vapor mixing zone to effect thorough mixing thereof before passing through a succeeding body, draining condensates and polymers from the catalyst, continuously removing refined vapors and separately condensing said refined vapors.

4. The method of refining hydrocarbon vapors containing unstable unsaturated compounds which comprises passing the vapors in a horizontal stream alternately through zones of filtration and mixing, subjecting the vapors in the filtration zones to the action of solid absorptive catalysts capable of polymerizing the unstable compounds, collecting the vapors from the filtration zones in the mixing zones to effect thorough mixing of the vapors and to prevent channelling of the vapors in the filtration zones, draining the condensates and polymers at a plurality of points along said stream, and separately condensing the refined vapors.

5. The method of refining hydrocarbon vapors containing unstable unsaturated compounds which comprises passing the vapors through an elongated horizontal vapor treating chamber, contacting the vapors while passing through said chamber with a series of beds of solid adsorptive catalyst to effect polymerization of said unstable compounds, passing the vapors from each preceding bed of the series through a vapor zone prior to contacting them with a succeeding bed of the catalyst to effect mixing and to prevent channelling of the vapors through the catalyst, continuously withdrawing condensates and polymers separated in the treating chamber and condensing the refined vapors.

6. The method according to claim 5 in which at least two of the beds of catalyst contain materials of different adsorptive efficiencies.

7. The method according to claim 5 in which at least two of the beds of catalyst contain materials of different mesh.

8. The method of refining hydrocarbon vapors containing unstable unsaturated constituents which comprises passing said vapors in a horizontal direction through a bed of solid adsorptive catalyst effective to promote polymerization of said unstable unsaturated constituents to compounds of higher boiling point, without substantial change in the direction of flow of the vapors out of the horizontal as they pass through the bed, at a temperature below a cracking temperature, causing the polymers formed to condense and flow downwardly through the bed of catalytic material in a direction lateral to that of the flow of vapors, removing said polymers from the lower portion of the bed of catalytic material and separately removing the treated vapors.

R. J. DEARBORN.
WILLIAM M. STRATFORD.